United States Patent
Velusamy et al.

(10) Patent No.: US 9,129,223 B1
(45) Date of Patent: *Sep. 8, 2015

(54) SOUND LOCALIZATION WITH ARTIFICIAL NEURAL NETWORK

(71) Applicant: Rawles LLC, Wilmington, DE (US)

(72) Inventors: Kavitha Velusamy, San Jose, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,807

(22) Filed: Mar. 17, 2014

Related U.S. Application Data

(63) Continuation of application No. 13/076,201, filed on Mar. 30, 2011, now Pat. No. 8,676,728.

(51) Int. Cl.
| | | |
|---|---|---|
| G06F 15/18 | (2006.01) | |
| G06E 1/00 | (2006.01) | |
| G06E 3/00 | (2006.01) | |
| G06G 7/00 | (2006.01) | |
| G06N 3/08 | (2006.01) | |

(52) U.S. Cl.
CPC ........................ *G06N 3/08* (2013.01)

(58) Field of Classification Search
None
See application file for complete search history.

(56) References Cited

U.S. PATENT DOCUMENTS

| | | | |
|---|---|---|---|
| 7,043,066 B1 | 5/2006 | Doi et al. | |
| 7,269,096 B2 | 9/2007 | Millikin | |
| 7,667,125 B2 | 2/2010 | Taub et al. | |
| 7,714,222 B2 | 5/2010 | Taub et al. | |
| 7,838,755 B2 | 11/2010 | Taub et al. | |
| 7,884,276 B2 | 2/2011 | Taub et al. | |
| 7,982,119 B2 | 7/2011 | Taub et al. | |
| 8,035,020 B2 | 10/2011 | Taub et al. | |
| 8,258,391 B2 | 9/2012 | Taub et al. | |
| 8,471,135 B2 | 6/2013 | Taub et al. | |
| 8,505,021 B2 | 8/2013 | Zaitsev | |
| 8,666,042 B2 * | 3/2014 | Wu et al. ................... 379/93.21 |
| 8,676,728 B1 * | 3/2014 | Velusamy et al. ............... 706/12 |
| 8,855,295 B1 * | 10/2014 | Chhetri et al. ........... 379/406.03 |
| 8,885,815 B1 * | 11/2014 | Velusamy et al. ....... 379/406.03 |
| 2012/0327115 A1 * | 12/2012 | Chhetri et al. ................. 345/633 |

(Continued)

FOREIGN PATENT DOCUMENTS

CA 2473564 8/2003

OTHER PUBLICATIONS

An hypothesis test technique for determining a difference in sampled parts defective utilizing Fisher's exact test IC production Hackerott, M.; Urquhart, A. Semiconductor Manufacturing, IEEE Transactions on vol. 3, Issue: 4 DOI: 10.1109/66.61974 Publication Year: 1990, pp. 247-248.*

(Continued)

*Primary Examiner* — Michael B Holmes
(74) *Attorney, Agent, or Firm* — Lee & Hayes, PLLC

(57) ABSTRACT

The location of a sound within a given spatial volume may be used in applications such as augmented reality environments. An artificial neural network processes time-difference-of-arrival data (TDOA) from a known microphone array to determine a spatial location of the sound. The neural network may be located locally or available as a cloud service. The artificial neural network is trained with perturbed and non-perturbed TDOA data.

20 Claims, 7 Drawing Sheets

(56) References Cited

U.S. PATENT DOCUMENTS

2012/0327746 A1* 12/2012 Velusamy .................. 367/127
2013/0106984 A1* 5/2013 Wu et al. .................. 348/14.08

OTHER PUBLICATIONS

Maximum likelihood time of arrival estimation for real-time physical location tracking of 802.11a/g mobile stations in indoor environments Voltz, P.J. ; Hernandez, D. Position Location and Navigation Symposium, 2004. PLANS 2004 DOI: 10.1109/PLANS.2004.1309046 Publication Year: 2004 , pp. 585-591.*

A new geometric approach to mobile position in wireless LAN reducing complex computations Zaidi, M. ; Tourki, R. ; Ouni, R. Design and Technology of Integrated Systems in Nanoscale Era (DTIS), 2010 5th International Conference on DOI: 10.1109/DTIS.2010.5487566 Publication Year: 2010 , pp. 1-7.*

Automatic microphone array position calibration using an acoustic sounding source, Jager, P.D. ; Trinkle, M. ; Hashemi-Sakhtsari, A. Industrial Electronics and Applications, 2009. ICIEA 2009. 4th IEEE Conference on DOI: 10.1109/ICIEA.2009.5138521 Publication Year: 2009 , pp. 2110-2113.*

Pinhanez, "The Everywhere Displays Projector: A Device to Create Ubiquitous Graphical Interfaces", IBM Thomas Watson Research Center, Ubicomp 2001, 18 pages.

* cited by examiner

SOUND LOCALIZATION WITH ARTIFICIAL NEURAL NETWORK

RELATED APPLICATIONS

The present application claims priority to U.S. patent application Ser. No. 13/076,201 filed on Mar. 30, 2011, entitled "Sound Localization with Artificial Neural Network," which is incorporated by reference herein in its entirety.

BACKGROUND

Determination of the location of acoustic signals within a given volume is used in many areas. For example, acoustic signals such as handclaps or fingersnaps may be used as input within augmented reality environments. Traditional methods of localizing, or determining the spatial coordinates, of an acoustic source are sensitive to changes in the environment and frequently produce erroneous results. What is desired is a way to effectively and accurately determine the spatial coordinates of an acoustic signal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
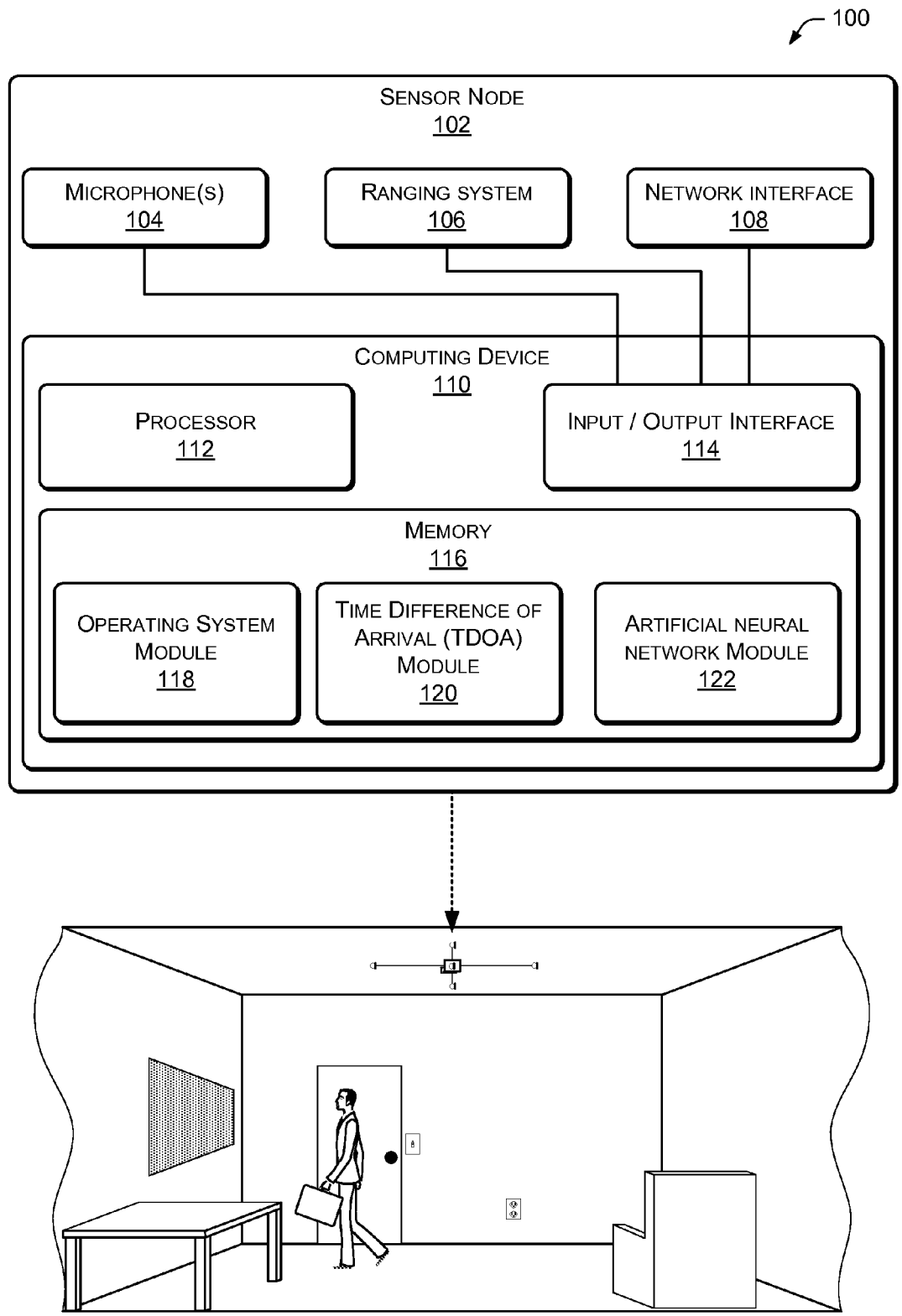
FIG. 1 shows an illustrative scene with a sensor node configured to determine spatial coordinates of an acoustic signal which is deployed in an exemplary room, such as may be used in an augmented reality environment.

Augmented reality environments may utilize acoustic signals such as audible gestures, human speech, audible interactions with object in the physical environment, and so forth for input. Detection of these acoustic signals provides for minimal input, but richer input modes are possible where the acoustic signals may be localized, or located in space. For example, a handclap at chest height may be ignored as applause while a handclap over the user's head may call for execution of a special function. In one example, the localization may be of acoustic signals propagated through a medium having a density less than 1000 kilograms per cubic meter. For example, gaseous air at about one standard atmosphere of pressure (about 100 kilopascals).

A plurality of microphones may be used to detect an acoustic signal. By measuring the time of arrival of the acoustic signal at each of the microphones, and given a known position of each microphone relative to one another, time-difference-of-arrival data is generated. This time-difference-of-arrival (TDOA) data may be used for hyperbolic positioning to calculate the location of the acoustic signal. The acoustic environment, particularly with audible frequencies (including those extending from about 300 Hz to about 3 KHz), are signal and noise rich. Furthermore, acoustic signals interact with various objects in the physical environment, including users, furnishings, walls, and so forth. Small perturbations or variations in the TDOA data occur and result in significant and detrimental changes in the calculated location of the acoustic signal.

Disclosed herein are devices and techniques for training an artificial neural network and utilizing the trained artificial neural network for determining the spatial coordinates of an acoustic signal based at least in part upon TDOA data. Microphones are disposed in a pre-determined physical arrangement having relative locations to one another which are known. An origin point may be specified relative to the microphones. The spatial coordinates of the acoustic signal may then be defined relative to the origin. An artificial neural network is trained to accept the TDOA data at input nodes and present spatial coordinates at output nodes.

Training of the neural network may employ a variety of training modes, including supervised training with back-propagation. In supervised training, known spatial coordinates as well as TDOA data for an acoustic source are provided to the artificial neural network which associates the given TDOA data with the specific spatial coordinates. During training, the TDOA data is be perturbed within a pre-determined excursion range. As a result, the artificial neural network is trained with perturbed and non-perturbed data. Training with these perturbations adds robustness to the neural network's determination of the spatial coordinates of the acoustic signal. For example, in conventional techniques, a slight variation in TDOA data may result in a significant displacement of the calculated spatial coordinates, or a complete breakdown of the calculation algorithm resulting in erroneous coordinates. In contrast, the artificial neural network has been trained to accept these slight variations and still determine a set of spatial coordinates which correspond to the actual spatial coordinates of the input signal.

The trained neural network may then be replicated and deployed for use with microphone configurations matching those used during the training phase. Artificial neural networks of varying complexities may also be deployed for contemporaneous use. For example, a first artificial neural network having a relatively small number of nodes may be deployed on a local device for an initial or "rough" determination of the spatial coordinates. A second artificial neural network may be deployed remotely, such as within a cloud server, which contains a relatively larger number of nodes which is capable of providing a more precise set of spatial coordinates. The local device may then use the first (local) artificial neural network for initial position data, while sending the TDOA data or a subset thereof to the remote resource of contemporaneous processing. The second artificial neural network with its larger neural network may then reply with a more precise set of spatial coordinates. These higher precision spatial coordinates may be merged with or replace the initial coordinates to increase overall accuracy of the system.

ILLUSTRATIVE ENVIRONMENT

FIG. 1 shows an illustrative scene 100 of a room with a sensor node 102. The sensor node 102 is configured to determine spatial coordinates of an acoustic signal in the room, such as may be used in an augmented reality environment. The sensor node 102 may be located at various locations around the room, such as on the ceiling, on a wall, on a table, floor mounted, and so forth.

As shown here, the sensor node 102 incorporates or is coupled to a plurality of microphones 104 configured to receive acoustic signals. A ranging system 106 may also be present which provides another method of measuring the distance to objects within the room. The ranging system 106 may comprise laser range finder, acoustic range finder, optical range finder, structured light module, and so forth. The structured light module may comprise a structured light source and camera configured to determine position, topography, or other physical characteristics of the environment or objects therein based at least in part upon the interaction of structured light from the structured light source and an image acquired by the camera.

A network interface 108 may be configured to couple the sensor node 102 with other devices placed locally such as within the same room, on a local network such as within the same house or business, or remote resources such as accessed via the internet. In some implementations, components of the sensor node 102 may be distributed throughout the room and configured to communicate with one another via cabled or wireless connection.

The sensor node 102 may include a computing device 110. The computing device 110 may comprise one or more processors 112, one or more input/output interfaces 114, and a memory 116. The memory 116 may store an operating system 118, time-difference-of-arrival (TDOA) module 120, and an artificial neural network module 122. In some implementations, the resources among a plurality of computing devices 110 may be shared. These resources may include input/output devices, processors 112, memory 116, and so forth. The memory 116 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The input/output interface 114 may be configured to couple the computing device 110 to microphones 104, ranging system 106, network interface 108, or other devices such as an atmospheric pressure sensor, temperature sensor, hygrometer, barometer, an image projector, camera, and so forth. The coupling between the computing device 110 and the external devices such as the microphones 104 and the network interface 108 may be via wire, fiber optic cable, wirelessly, and so forth.

The TDOA module 120 is configured to calculate time differences of arrival data for acoustic signals received by the microphones 104. In some implementations the TDOA module 120 may be configured to accept data from the sensors accessible to the input/output interface 114. For example, the TDOA module 120 may determine time differences of arrival based at least in part upon changes in temperature and humidity. The artificial neural network module 122 is configured to accept these TDOA inputs and determine the spatial coordinates of a source of the acoustic signals. As described below with regards to FIG. 4, the artificial neural network in the artificial neural network module 122 may be pre-trained for a given microphone configuration prior to deployment.

Figure 2:
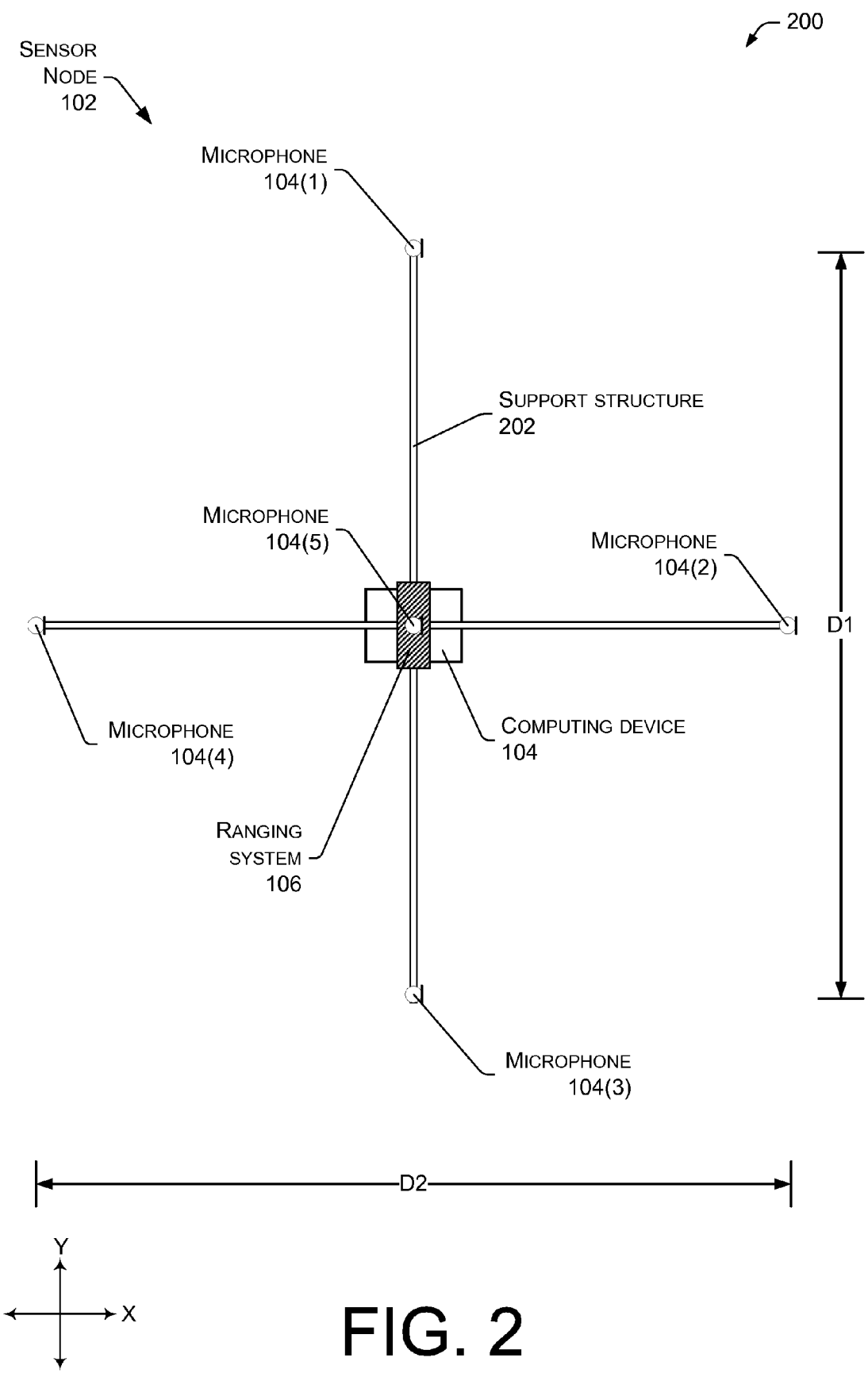
FIG. 2 shows an illustrative sensor node including a plurality of microphones deployed at pre-determined locations.

FIG. 2 shows an illustration 200 of the sensor node 102. In this illustration a support structure 202 describes a cross with two linear members disposed perpendicular to one another each having length of D1 and D2. The support structure 202 aids in maintaining a known pre-determined distance between the microphones which may then be used in the determination of the spatial coordinates of the acoustic signal. Five microphones 104(1)-(5) are disposed at the center of the cross as well as at the ends of each arm of the cross. It is understood that the number and placement of the microphones 104 as well as the shape of the support structure 202 may vary. For example, in other implementations the support structure may describe a triangular, circular, or another geometric shape. In some implementations an asymmetrical support structure shape, distribution of microphones, or both may be used.

The support structure 202 may comprise part of the structure of a room. For example, the microphones 104 may be mounted to the walls, ceilings, floor, and so forth at known locations within the room. In some implementations the microphones 104 may be emplaced, and their position relative to one another determined through other sensing means, such as via the ranging system 106, structured light scan, manual entry, and so forth.

The ranging system 106 is also depicted as part of the sensor node 102. As described above, the ranging system 106 may utilize optical, acoustic, radio, or other range finding techniques and devices. The ranging system 106 may be configured to determine the distance, position, or both between objects, users, microphones 104, and so forth. For example, in one implementation the microphones 104 may be placed at various locations within the room and their precise position relative to one another determined using an optical range finder configured to detect an optical tag disposed upon each.

In another implementation, the ranging system 106 may comprise an acoustic transducer and the microphones 104 may be configured to detect a signal generated by the acoustic transducer. For example, a set of ultrasonic transducers may be disposed such that each projects ultrasonic sound into a particular sector of the room. The microphones 104 may be configured to receive the ultrasonic signals, or dedicated ultrasonic microphones may be used. Given the known location of the microphones relative to one another, active sonar ranging and positioning may be provided.

Figure 3:
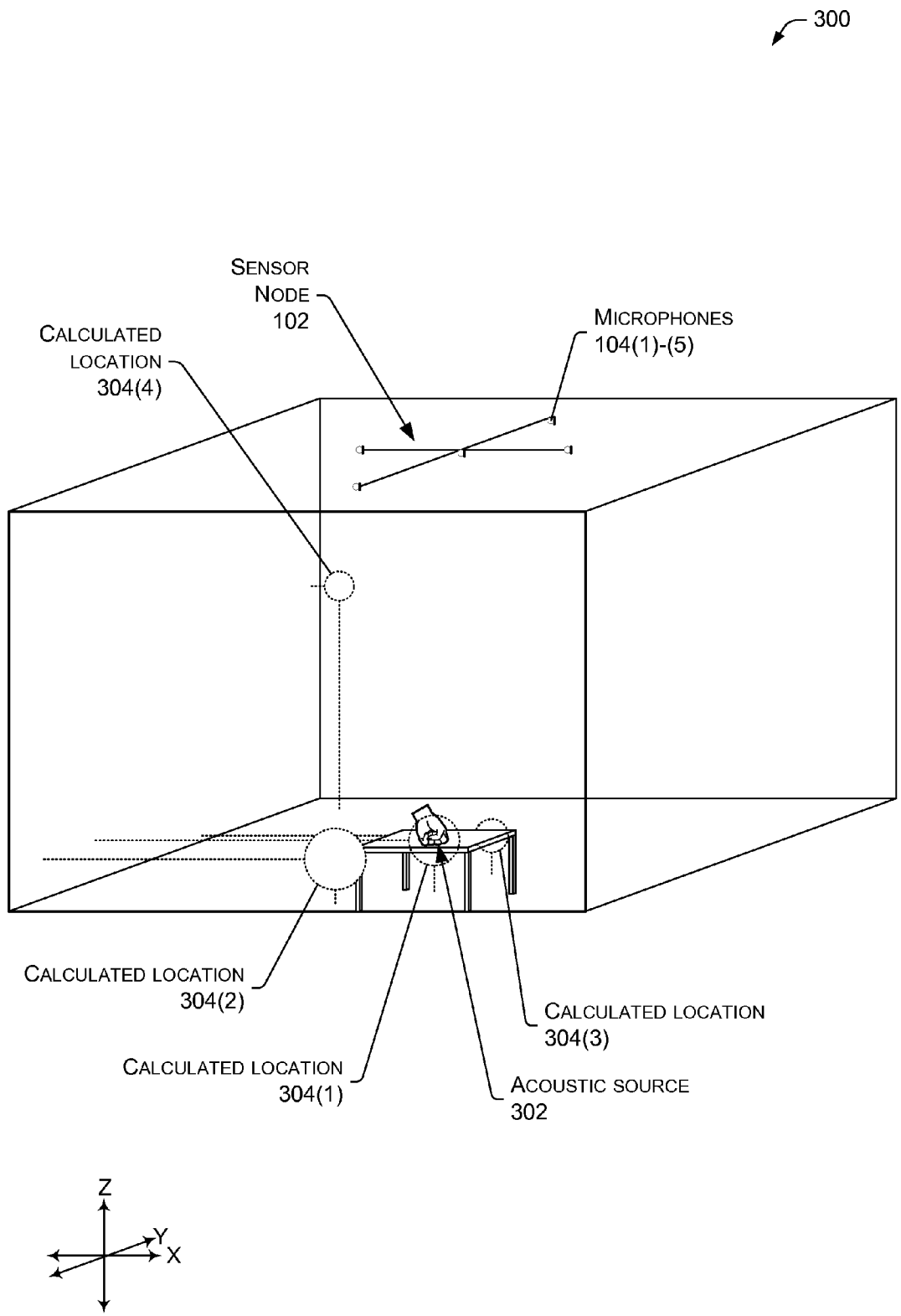
FIG. 3 depicts an illustrative volume including an acoustic source and a plurality of calculated locations for the acoustic source.

FIG. 3 depicts an illustrative volume 300 such as a room. In this illustration, the sensor node 102 is disposed on the ceiling while an acoustic source 302, such as a first knocking on a tabletop generates an acoustic signal. Because of changes in the TDOA values resulting from environment conditions such as noise, reverberation, and so forth, the calculated location of the acoustic source by a non-neural network process may vary. For example, the calculated locations may be distributed such that a calculated location 304(1) corresponds to the acoustic source 302, while other calculated locations 304(2) and 304(3) are adjacent and another calculated location 304(4) is on the other side of the room. Variations in the calculated locations 304 may also result from different TDOA acquisition techniques or other factors.

Figure 4:
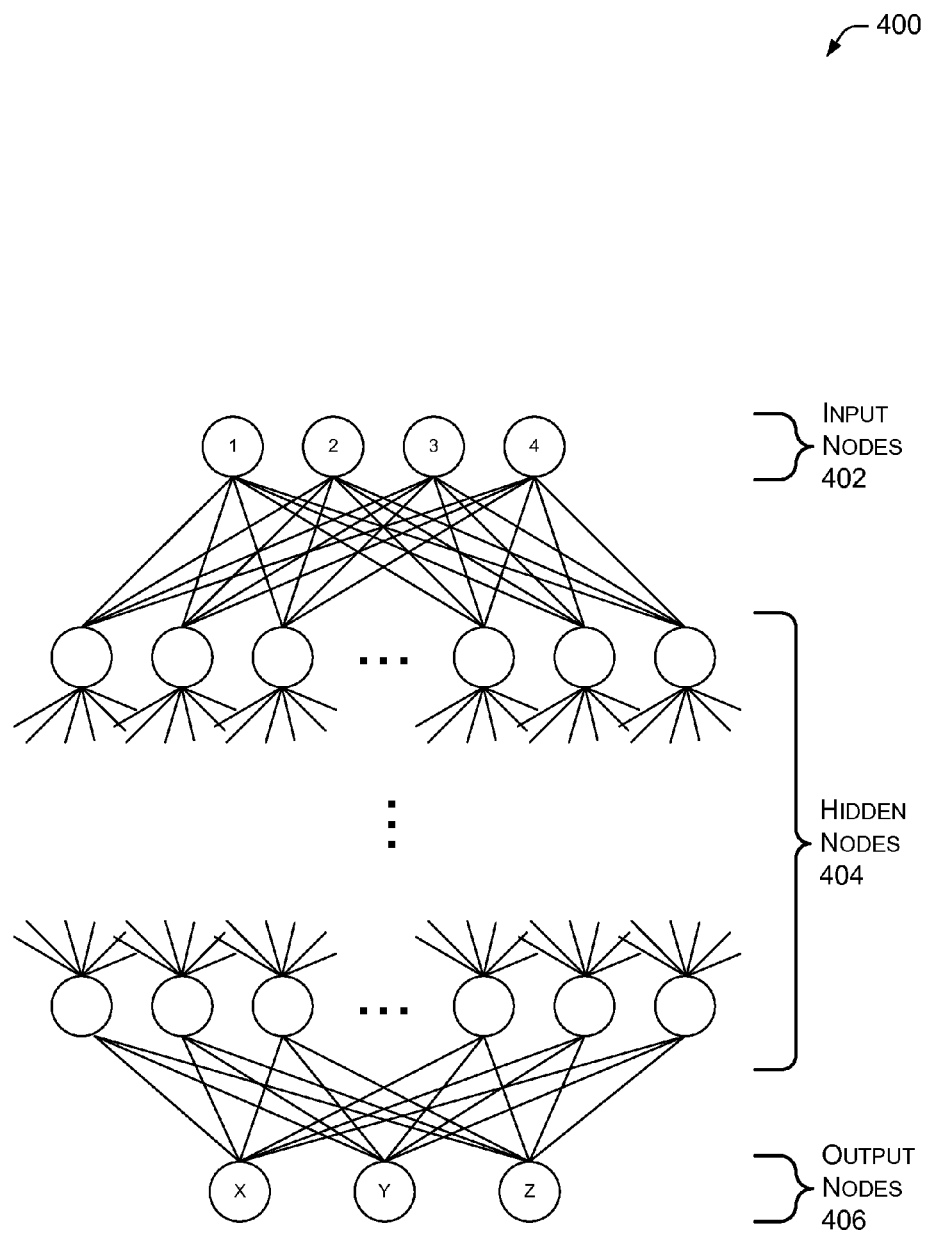
FIG. 4 depicts a schematic of an artificial neural network which is configured to use time-difference-of-arrival data to generate spatial coordinates.

FIG. 4 depicts a schematic 400 of an artificial neural network configured to generate spatial coordinates based at least in part upon TDOA data. Neural networks comprise a series of interconnected nodes. These nodes are typically, but not necessarily, connected with nonlinear thresholds such that the input and output responses mimic to some extent the processes of organic neural networks, such as within the animal brain. The neural network may comprise input nodes 402 which are configured to accept initial starting data, such as the TDOA data described herein. For example, in an implementation with five microphones 104 used for generation of TDOA data, there would be four pieces of input data. Thus, the number of input nodes 402 would be n–1 where n is the number of microphones in the system.

Coupled to the input nodes 402 are a plurality of hidden nodes 404. These hidden nodes interconnect with one another. Generally speaking, given a larger number of nodes, more nuanced and thus more precise spatial coordinates may be generated. There may be many layers or courses of hidden nodes 404 within the neural network. For example, a relatively small neural network with two or three layers of hidden nodes may be used to provide a local and quickly executed estimate of the spatial coordinates while a relatively large neural network deployed on a remote cloud resource having forty layers may be used to generate more precise spatial coordinates.

The neural network itself may use a variety of configurations, including a hidden Markov model (HMM). The HMM creates a statistical model of the situation to be solved, and may be considered the simplest dynamic Bayesian network.

Neural networks may be trained or taught in a variety of ways to produce desired output given particular inputs. Supervised training involves presenting the neural network with a set of inputs and a known correct answer. Using backpropagation, the neural network here is trained to recognize that a pre-determined location of the acoustic source corresponds to a given set of TDOA values.

TDOA data is prone to perturbation and this perturbation causes significant problems with conventional systems seeking to spatially locate the acoustic source. As described here, the TDOA data may be perturbed within a pre-determined excursion range and the neural network is trained with perturbed and non-perturbed data. As a result, the neural network learns to cope with the variability experienced during actual use under non-ideal conditions. For example, TDOA data from a given microphone may be varied ±5%, and these inputs fed into the neural network for training such that the neural network recognizes that these perturbed inputs are still associated with a particular physical location.

Coupled to the hidden nodes 404 by a plurality of interconnections are the output nodes 406. The number of output nodes may vary. For ease of illustration and not by way of limitation, three output nodes are depicted corresponding to the X, Y, and Z coordinates in a three axis orthogonal space. In other implementations other coordinate systems may be used, such as a cylindrical coordinate system.

Figure 5:
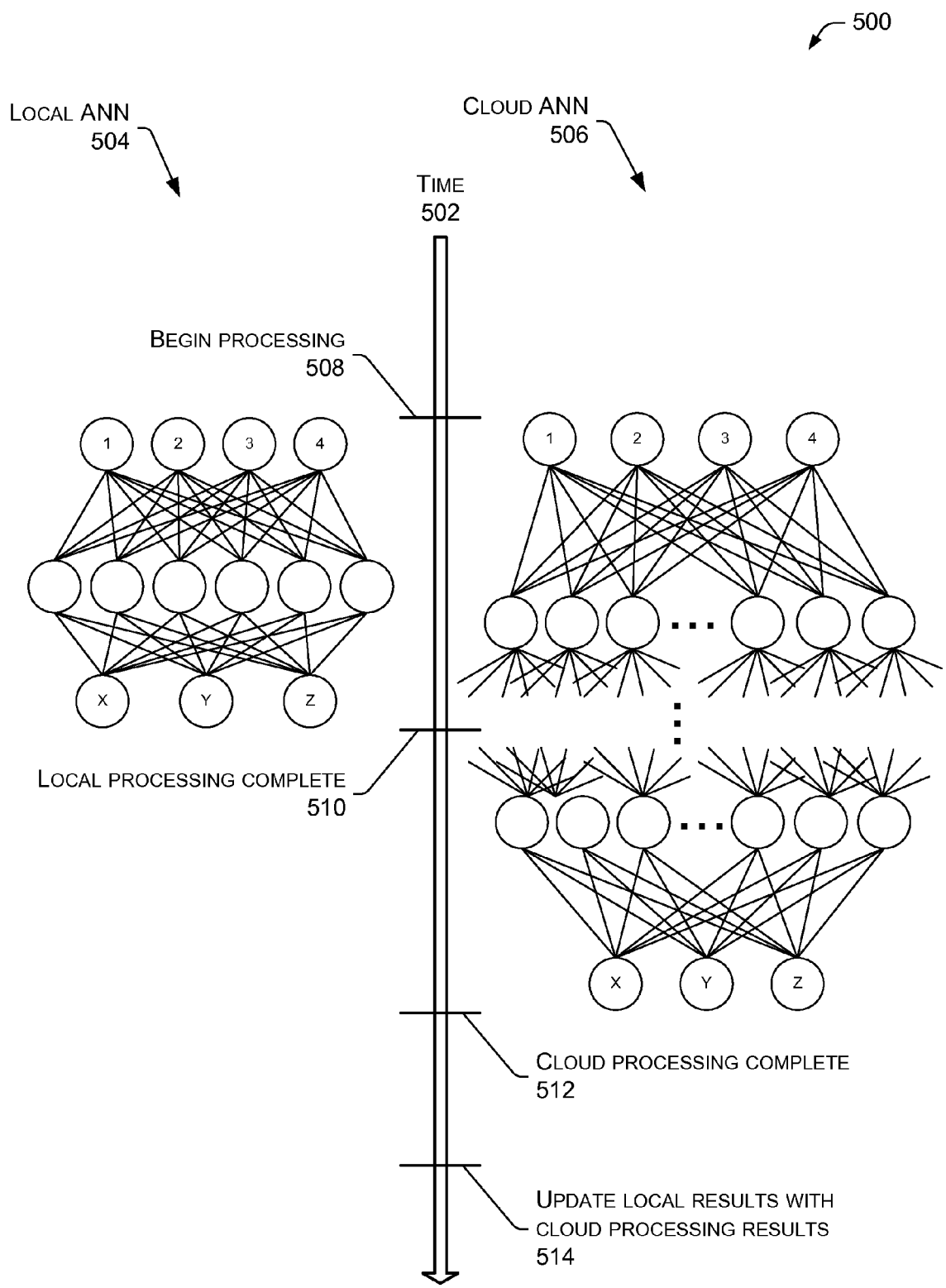
FIG. 5 illustrates an artificial neural network available on the local device as well as an artificial neural network available as a cloud resource, and the use of both.

FIG. 5 illustrates multiple available neural networks 500. In some situations, local resources such as processor 112 capability and memory 116 may limit the size of artificial neural network which may be used in determining the spatial coordinates of an acoustic signal. The size of the neural network may also be constrained to maintain response time requirements. For example, a small neural network executed locally on the computing device 110 associated with the sensor node 102 may provide spatial coordinates which are accurate to a coarse degree, such as ±20 centimeters within a given response time such as 10 milliseconds.

At a remote resource, such as a dedicated server elsewhere on the local network or at a cloud resource available via the internet, resources may permit a neural network with many more nodes and layers. This relatively large neural network (as compared to the local neural network) may be able to provide a more precise set of spatial coordinates. The remote resource may have the advantage of additional processing speed which exceeds that available in the computing device 110, but accessing that resource may be affected by factors such as network latency, network congestion, and so forth.

As shown here in FIG. 5, the computing device 110 may use a plurality of artificial neural networks contemporaneously to minimize response time and maximize accuracy. In this illustration, time 502 increases in the direction shown by the arrow pointing down the page. On the left of the time 502 arrow is the local artificial neural network (ANN) 504 having a relatively small number of nodes, while to the right is the cloud artificial neural network 506 which contains a relatively large number of nodes.

At time 508, TDOA data is received and the local ANN 504 begins to process the data to generate spatial coordinates of the acoustic source. Meanwhile, the TDOA data or a portion thereof is packaged and transmitted to the cloud ANN 506 for processing. As a result, the local ANN 504 and the cloud ANN 506 may be contemporaneously processing the TDOA data.

At time 510, the local processing is complete and the local ANN 504 returns spatial coordinates which may be coarse. At time 512, the cloud processing is complete and the cloud results with finer spatial coordinates are returned to the computing device 110. At time 514, the local results may be updated or modified by the cloud processing results.

The sequencing of events is shown here for illustration and not by way of limitation. In some situations the time for local processing on the local ANN 504 may exceed the response from the cloud ANN. In such a situation, the local ANN results may be used or discarded.

Figure 6:
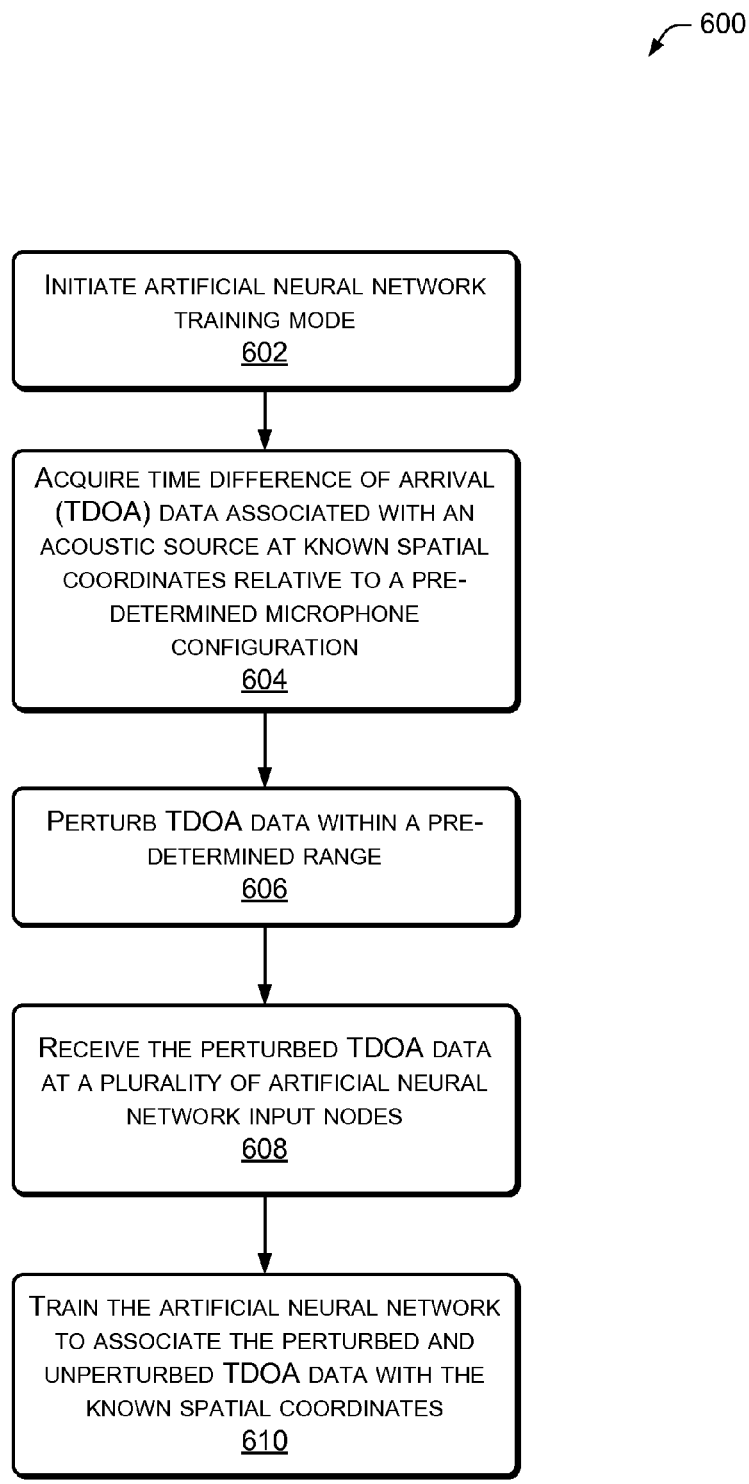
FIG. 6 is an illustrative process of training the artificial neural network with perturbed time-difference-of-arrival data.

FIG. 6 is an illustrative process 600 of training the artificial neural network with perturbed time-difference-of-arrival data. Training with perturbed data allows the artificial neural network to accommodate the real-world variations and disturbances which may occur within the time-difference-of-arrival data. By analogy, consider a person learning to distinguish particular sounds. If the person is trained to distinguish sounds in a perfectly quiet environment, they would experience difficulty in trying to distinguish those same sounds in a noisy environment. However, if the person is trained to distinguish those sounds from the outset in a noisy environment the recognition process is improved. Similarly, by training the artificial neural network with perturbed TDOA data, the artificial neural network learns to process non-ideal TDOA data from a real-world source.

While the following process describes supervised learning with backpropagation, it is understood that other training techniques may be used such as unsupervised learning, reinforcement learning, and so forth. At 602, an artificial neural network training mode is initiated within the artificial neural network.

At 604, time-difference-of-arrival (TDOA) data associated with an acoustic source at a set of known spatial coordinates and relative to a pre-determined microphone configuration is acquired. These known spatial coordinates as well as the relative position and configuration of the microphones may be manually set or determined via other sensing mechanisms. For example, a camera and structured light source may be used to determine the relative position of the microphones, the acoustic source object, and so forth.

In some implementations where the neural network operates in an unsupervised learning mode. In this mode, the location of an object may be determined such as via structured light and that position may be associated with TDOA data corresponding to acoustic signals received from within a pre-determined volume proximate to the object. Over time as the neural network is trained the location determination using structured light or other process may give way to the acoustically determined spatial coordinates of the acoustic signal.

At 606, the TDOA data is perturbed within a pre-determined range. For example, a 5% variation or excursion in TDOA values may be introduced. The perturbation value may be pseudo-random or determinable. In another implementation this perturbation may be free running and not constrained to a pre-determined range.

At 608, the perturbed TDOA data is received at a plurality of artificial neural network input nodes. For example, the input nodes 402 or FIG. 4 may accept the TDOA data, each node accepting a particular piece of the TDOA data set corresponding to a particular TDOA value.

At 610, the artificial neural network is trained to associate the perturbed TDOA data with the known spatial coordinates. In some implementations unperturbed data may also be used to train the artificial neural network. The training may include multiple iterations of providing perturbed, unperturbed, or both perturbed and unperturbed data to the artificial neural network corresponding to a particular set of known spatial coordinates.

Figure 7:
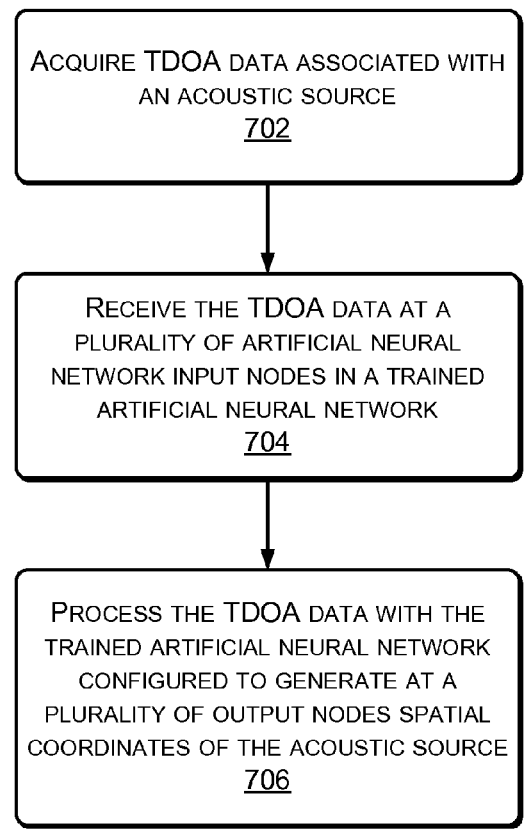
FIG. 7 is an illustrative process of providing time-difference-of-arrival data to the trained neural network to determine spatial coordinates of the acoustic source.

FIG. 7 is an illustrative process 700 of providing time-difference-of-arrival data to the trained neural network to determine spatial coordinates of the acoustic source. At 702, TDOA data associated with an acoustic source having unknown spatial coordinates is acquired. In some implementations, the TDOA data may be pre-processed, filtered, or otherwise modified. For example, reverberations may be removed, noise filtering may be applied, and so forth. At 704, the TDOA data is received at a plurality of artificial neural network input nodes in a trained artificial neural network.

At 706, the trained artificial neural network configured to generate, at a plurality of output nodes, spatial coordinates of the acoustic source processes the TDOA data and outputs the spatial coordinates. Because the neural network has been trained to accommodate perturbed TDOA data, the determination of spatial coordinates by the neural network is robust. As a result, the determined spatial coordinates more closely correspond to the actual spatial coordinates of the acoustic signal.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a first microphone;
   a second microphone;
   one or more processors; and
   one or more computer-readable media storing computer-executable instructions that, when executed, cause the one or more processors to perform acts comprising:

determine a difference between a time-of-arrival of a first acoustic signal at the first microphone and a time-of-arrival of a second acoustic signal at the second microphone, the first acoustic signal and the second acoustic signal associated with an acoustic source;
   receive the determined difference at a plurality of input nodes of an artificial neural network; and
   generate, at a plurality of output nodes of the artificial neural network, spatial coordinates of the acoustic source.

2. The system as recited in claim 1, wherein the first microphone and the second microphone are positioned in a pre-determined arrangement within an environment.

3. The system as recited in claim 2, wherein the artificial neural network is pre-trained based at least in part on the pre-determined arrangement of the first microphone and the second microphone within the environment.

4. The system as recited in claim 1, wherein a greater number of the plurality of input nodes positively correlates to a more precise generated spatial coordinates of the acoustic source at the plurality of output nodes on the artificial neural network.

5. The system as recited in claim 1, the acts further comprising:
   train the artificial neural network with backpropagation using an acoustic signal at known spatial coordinates.

6. The system as recited in claim 1, wherein the acoustic signal comprises human speech.

7. The system as recited in claim 1, wherein a user at least in part generates the acoustic signal.

8. The system as recited in claim 1, wherein the acoustic signal comprises an audible gesture within an augmented reality environment.

9. One or more computer-readable media storing computer-executable instructions that, when executed, cause one or more processors to perform acts comprising:
   receiving a first indication of a first acoustic signal generated from a source at a first microphone;
   receiving a second indication of a second acoustic signal generated from the source at a second microphone;
   determining a difference of time between the receiving of the first indication and the receiving of the second indication;
   receiving, at a plurality of input nodes of an artificial neural network, the determined difference; and
   generating, at a plurality of output nodes of the artificial neural network, spatial coordinates of the source.

10. The one or more computer-readable storage media as recited in claim 9, further comprising:
    varying the determined difference of time within a pre-determined range; and
    training the artificial neural network to associate the varied determined difference with the generated spatial coordinates.

11. The one or more computer-readable storage media as recited in claim 9, further comprising:
    training the artificial neural network to associate the determined difference with the generated spatial coordinates.

12. The one or more computer-readable storage media as recited in claim 9, wherein the generating comprises generating the spatial coordinates locally using a first artificial neural network, and further comprises generating spatial coordinates remotely using a second artificial neural network, the second artificial neural network comprising additional nodes compared to the first artificial neural network.

13. The one or more computer-readable storage media as recited in claim 12, wherein the second artificial neural network is configured to execute as a cloud compute resource accessible to a plurality of users.

14. The one or more computer-readable storage media as recited in claim 12, further comprising modifying the spatial coordinates of the source with combined results from the first artificial neural network and the second artificial neural network.

15. A system configured to estimate a physical location of an acoustic source within an environment, the system comprising:
   first and second microphones positioned in the environment;
   one or more processors;
   one or more computer-readable media storing computer-executable instructions that, when executed, cause the one or more processors to perform acts comprising:
   measure, at the first microphone, a time of arrival of an acoustic signal associated with the acoustic source;
   measure, at the second microphone, a time of arrival of the acoustic signal associated with the acoustic source;
   determine a difference between the measured time of arrival of the acoustic signal at the first microphone and the measure time of arrival of the acoustic signal at the second microphone;
   receive the determined difference at a plurality of input nodes of a trained artificial neural network; and
   estimate, at a plurality of output nodes of the trained artificial neural network, the physical location of the acoustic source within the environment.

16. The system as recited in claim 15, wherein the first and second microphones are positioned in the environment in a pre-determined arrangement, the first microphone having a known location relative to the second microphone.

17. The system as recited in claim 16, wherein the trained artificial network is pre-trained based on the pre-determined arrangement of the first and second microphones.

18. The system as recited in claim 15, the acts further comprising:
   vary the determined difference within a pre-determined range of time; and
   update the trained artificial neural network to associate the varied determined difference with the estimated physical location.

19. The system as recited in claim 15, the system further comprising:
   at least one camera to capture structured light within the environment;
   a ranging system to project structured light within the environment; and wherein the acts further comprising:
   update the trained artificial neural network with physical characteristics of the environment based at least on reflected structured light captured by the at least one camera.

20. The system as recited in claim 19, wherein the ranging system comprises a one of a structured light module, a laser range finder, or an optical range finder.

* * * * *